United States Patent
Kuroda et al.

(10) Patent No.: US 6,307,824 B1
(45) Date of Patent: Oct. 23, 2001

(54) DYE RECORD MEDIUM, RECORD DISC PRODUCING APPARATUS, AND INFORMATION RECORDING/REPRODUCING APPARATUS

(75) Inventors: Kazuo Kuroda; Shoji Taniguchi; Akiyoshi Inoue, all of Tokorozawa (JP)

(73) Assignee: Pioneer Electronics Corporation, Tokyo-to (JP)

( * ) Notice: Subject to any disclaimer, the term of this patent is extended or adjusted under 35 U.S.C. 154(b) by 0 days.

(21) Appl. No.: 09/635,408

(22) Filed: Aug. 10, 2000

Related U.S. Application Data

(63) Continuation of application No. 09/071,493, filed on May 4, 1998, now abandoned.

(30) Foreign Application Priority Data

May 7, 1997 (JP) ............................................. P09-116627

(51) Int. Cl.[7] ....................................................... G11B 7/00
(52) U.S. Cl. ....................... 369/53.11; 369/53.2; 369/111
(58) Field of Search ................................. 369/53.11, 53.2, 369/111, 275.3, 275.4

(56) References Cited

U.S. PATENT DOCUMENTS 5,696,758 * 12/1997 Yamagimachi et al. .......... 369/275.4
6,031,808   2/2000 Ueno .

* cited by examiner

Primary Examiner—Nabil Hindi
(74) Attorney, Agent, or Firm—Young & Thompson

(57) ABSTRACT

A dye record disc has a disc shape substrate having a track-forming surface divided into a read-only area and a recordable area. A reproducing track is formed on the track-forming surface in the read-only area, and has a plurality of pits, each of the pits comprising a dye material, and having a shape corresponding to the reproducing information. A recording/reproducing track is formed on the track-forming surface in the recordable area, and extends continuously, the recording/reproducing track comprising the same dye material as each of the pits. The information reproducing apparatus includes an initial light emitting device for emitting an initial light beam to all of the pits before reproduction, in order to change reflectance of all of the pits; a reproducing light emitting device for emitting a reproducing light to each of the pits; a receiving device for receiving reflected light of the reproducing light reflected by the reproducing track, and generating a receiving signal corresponding to the received reflective light; and a reproducing device for reproducing the reproducing information on the basis of the receiving signal.

12 Claims, 7 Drawing Sheets

DYE RECORD MEDIUM, RECORD DISC PRODUCING APPARATUS, AND INFORMATION RECORDING/ REPRODUCING APPARATUS

CROSS-REFERENCE TO RELATED APPLICATIONS

This application is a continuation of application Ser. No. 09/071,493, filed May 4, 1998 now abandoned.

BACKGROUND OF THE INVENTION

1. Field of the Invention

The present invention relates to a hybrid disc of a dye membrane recording type having a read-only area and a recordable area.

2. Description of the Related Art

A read-only optical disc, such as a CD (Compact Disc) of a read only type has become widespread. Such a read-only optical disc has phase pits to record information. Each phase pit is formed such that its depth is equal to one-four wavelength $\lambda$ of a light beam used for reproduction, i.e., $\lambda/4$.

On the other hand, a recordable optical disc is developed. Especially, as one type of the recordable optical disc, a write once type optical disc, such as a CD-R (CD-Recordable) and the like is frequently developed. Such a write once type optical disc has a recording layer composed of a dye membrane. When information is recorded on the write once type optical disc, a light beam modulated such that its intensity is changed depending on the information is emitted onto the recording layer. Thereby, reflectance of the dye membrane at the irradiated part is changed. Thus, the information is recorded on the disc. When reproducing, the recorded information is reproduced on the basis of a change of reflectance.

Here, in the above mentioned write once type optical disc, the intensity of the light beam used for recording is alternatively changed between a first intensity and a second intensity. Namely, when the information to be recorded onto the disc is a high level, the intensity of the light beam is the first intensity. When the information is a low level, the intensity of the light beam is the second intensity. The second intensity is weaker than the first intensity, and the second intensity is roughly or accurately equal to the intensity of a light beam used for reproduction. When the information is recorded on the disc, reflectance of the dye membrane is changed by switching over the intensity of the light beam between the first intensity and the second intensity. In order to increase the intensity of the light beam, it is preferable that the light beam is efficiently used.

Furthermore, when the information is recorded on the write one type optical disc, it is necessary that the light beam is accurately emitted on the target track in order to record the information on it accurately. Therefore, a tracking control is performed. Various kinds of methods to perform the tracking control have been developed. In view of the efficiency of the light beam, a push-pull method is preferably used as the tracking control for recording information on the write once type optical disc. In the push-pull method, a single light beam is used for both recording and the tracking control. In case that the tracking control is performed by using the push-pull method, in order to increase a level of a tracking error signal to the maximum, it is necessary that height (depth) of the information track of the write once type optical disc is one-eight waveform $\lambda$ of the light beam, i.e., $\lambda/8$.

Therefore, in the write once type optical disc, in view of both recording and reproduction, a predetermined value between $\lambda/8$ to $\lambda/4$ is set as the depth of the information track.

Here, in view of the recent development of multimedia, an optical disc having the function of the read-only optical disc and the function of the write once type optical disc is desired.

However, it is difficult to realize such an optical disc (Hereinafter, it is referred to as a "hybrid disc".). The reason is that the depth of the phase pit of the read-only optical disc is different from that of the information track of the write once type optical disc. Namely, the depth of the phase pit of the read-only optical disc is $\lambda/4$, but the depth of the information track of the write once type optical disc is the predetermined value between $\lambda/8$ to $\lambda/4$ (not $\lambda/4$). It is very difficult in view of a yield to form the phase pit and the information track each having different depth on a single disc.

SUMMARY OF THE INVENTION

It is therefore a first object of the present invention to provide a hybrid type dye record medium which can be easily produced.

Furthermore, it is a second object of the present invention to provide a record disc producing apparatus which can easily produce a record disc, such as a hybrid type dye record medium.

Moreover, it is a third object of the present invention to provide an information reproducing apparatus which can surely reproduce information recorded on a hybrid type dye record medium.

According to the present invention, the above mentioned first object can be achieved by a dye record medium provide with: a substrate having a track-forming-surface divided into a read-only area and a recordable area; a reproducing track formed on the track-forming-surface in the read-only area, and constructed by an arrangement of a plurality of pits, each of the pits comprising a dye material, having a shape corresponding to reproducing information, and having a constant predetermined height; and a recording/reproducing track formed on the track-forming-surface in the recordable area, and extending continuously, the recording/reproducing track comprising the same dye material as each of the pits, and having the same predetermined height as each of the pits.

Namely, the dye record medium has a two areas, i.e., the read-only area and the recordable area. In the read-only area, reproduction information is recorded on the track-forming-surface in advance as the reproducing track constructed by the arrangement of the plurality of pits. In the read-only area, reproducing the reproducing information is possible, but recording a new information is impossible. On the other hand, in the recordable area, both recording new information and reproducing the recorded information are possible.

In the read-only area, the reproducing track is formed. The reproducing track is constructed by the arrangement of the plurality of the pits. Each pit has a shape corresponding to the reproducing information. Namely, the shape of each pit is changed depending on conditions of the reproducing information. Thereby, when the reproducing track is irradiated with the light beam, reflectance of the light beam is changed on the basis of the shape of each pit. Furthermore, each pit is composed of at least dye material. Moreover, each pit having a constant predetermined height. The height means a length between the track-forming-surface and the top of the pit.

In the recordable area, the recording/reproducing track is formed. Unlike the reproducing track, the recording/reproducing track continuously extends. Namely, as the recording/reproducing track does not have pits, there is no break or gap in the recording/reproducing track.

Furthermore, the recording/reproducing track is compose of at least the same dye material as each of the pits of the reproducing track. Moreover, the recording/reproducing track has the same predetermined height as each of the pits of the reproducing track.

Accordingly, when the dye record medium is produced, the reproducing track and the recording/reproducing track can be simultaneously produced in the same process. As a result, it is possible to simplify the production process of the dye record medium and to produce the dye record medium easy.

Moreover, since the reproducing track is constructed by the arrangement of the plurality of pits each having the shape corresponding to the reproducing information, it is possible to reproduce the reproducing information surely.

Furthermore, the top surface of each of the pits and the top surface of the recording/reproducing track may be in the same plane. Accordingly, when the dye record medium is produced, the reproducing track and the recording/reproducing track can be simultaneously produced in the same process. As a result, it is possible to produce the hybrid type dye record medium easy.

Moreover, the substrate of the dye record medium has: a base; a reflective layer formed on the base, for reflecting the light beam; and a dye membrane formed on the reflective layer, a surface of the dye membrane is the track-forming-surface, each of the pits is integrated with the dye membrane, and the recording/reproducing track is integrated with the dye membrane.

Thus, when the dye record medium is produced, each of the pits and the recording/reproducing track can be simultaneously produced in the same process. Accordingly, it is possible to produce the hybrid type dye record medium easy.

According to the present invention, the above mentioned second object can be achieved by a record disc producing apparatus for producing a record disc, the record disc having: a disc shape substrate having a track-forming-surface divided into a read-only area and a recordable area; a reproducing track formed on the track-forming-surface in the read-only area, and constructed by an arrangement of a plurality of pits, each of the pits having a shape corresponding to reproducing information; and a recording/reproducing track formed on the track-forming-surface in the recordable area, and extending continuously, the record disc producing apparatus having: a rotation device for rotating the record disc; a sending device for sending the record disc in a radial direction of the recording disc; and an emitting device for emitting a first light beam having an intensity modulated on the basis of reproducing information when the reproducing track is formed in the read-only area, emitting a second light beam having a constant intensity when the recording/reproducing track is formed in the recordable area, and controlling the intensity of the first light beam and the intensity of the second intensity such that both the reproducing track and the recording/reproducing track have the same height.

Namely, the rotation device rotates the record disc, while the sending device sends the record disc in the radial direction of the record disc. The emitting device emits the light beam to the record disc, while these operation is performed. The emitting device emits the first light beam having an intensity modulated on the basis of reproducing information, when the reproducing track is formed in the read-only area. On the other hand, the emitting device emits the second light beam having a constant intensity when the recording/reproducing track is formed in the recordable area. Furthermore, the emitting device controls the intensity of the first light beam and the intensity of the second intensity such that both the reproducing track and the recording/reproducing track have the same height. Thus, the reproducing track and the recording/reproducing track can be easily formed, and the height of the reproduce track and the height of the recording/reproducing track can be easily equalized with each other.

According to the present invention, the above mentioned third object can be achieved by an information reproducing apparatus for reproducing information recorded on a dye record disc, the dye record disc comprising: a disc shape substrate having a track-forming-surface divided into a read-only area and a recordable area; a reproducing track formed on the track-forming-surface in the read-only area, and constructed by an arrangement of a plurality of pits, each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information reproducing apparatus having: an initial light emitting device for emitting an initial light beam to all of the pits before reproduction, in order to change reflectance of all of the pits; a reproducing light emitting device for emitting a reproducing light to each of the pits; a receiving device for receiving a reflective light of the reproducing light reflected by the reproducing track, and generating a receiving signal corresponding to the received reflective light; and a reproducing device for reproducing the reproducing information on the basis of the receiving signal.

Namely, before the information reproducing apparatus actually reproduces the reproducing information recorded in the read-only area, the initial light emitting device emits the initial light beam to all of the pits. Thereby, reflectance of all of the pits are changed. This enables to reproduce the reproducing information.

Thereafter, the reproducing light emitting device emits the reproducing light to each of the pits, and the receiving device receives the reflective light of the reproducing light reflected by the reproducing track. Furthermore, the receiving device generates a receiving signal corresponding to the received reflective light. Next, the reproducing device reproduces the reproducing information on the basis of the receiving signal.

Accordingly, it is possible to detect the reproducing information from the dye pits accurately, and to reproduce the reproducing information surely.

According to the present invention, the above mentioned third object can be also achieved by an information recording/reproducing apparatus for recording information onto a dye record disc and reproducing information recorded on the dye record disc, the dye record disc having: a disc shape substrate having a track-forming-surface divided into a read-only area and a recordable area; a reproducing track formed on the track-forming-surface in the read-only area, and constructed by an arrangement of a plurality of pits, each of the pits including a dye material, and having a shape corresponding to the reproducing information; and a recording/reproducing track formed on the track-formingsurface in the recordable area, and extending continuously, the recording/reproducing track including the same dye material as each of the pits, the information recording/reproducing apparatus having: an initial light emitting device for emitting an initial light beam to all of the pits before reproduction, in order to change reflectance of all of the pits; a reproducing light emitting device for emitting a reproducing light to each of the pits; a receiving device for receiving a reflective light of the reproducing light reflected by the reproducing track, and generating a receiving signal corresponding to the received reflective light; a reproducing device for reproducing the reproducing information on the basis of the receiving signal; and a recording light emitting device for emitting a recording light modulated on the basis of the recording information onto the recording/reproducing track, in order to record the record information onto the recording/reproducing track by changing reflectance of the recording/reproducing track.

Thus, the recording information is recorded by changing reflectance of the recording/reproducing track. Accordingly, the reproducing information recorded in the read-only area and information recorded on the recording/reproducing track in the recordable area can be reproduced respectively, by using the same reproducing light beam.

Furthermore, the initial light emitting device emits the initial light beam having an intensity not more than an intensity of the recording light and more than an intensity of the reproducing light. Thereby, the recording light emitting device, the reproducing light emitting device, and the initial light emitting device can be united, and it is possible to simplify the configuration of the apparatus.

According to the present invention, the above mentioned third object can be also achieved by an information reproducing method of reproducing information recorded on a dye record disc, the dye record disc having: a disc shape substrate having a track-forming-surface divided into a read-only area and a recordable area; a reproducing track formed on the track-forming-surface in the read-only area, and constructed by an arrangement of a plurality of pits, each of the pits including a dye material, and having a shape corresponding to the reproducing information; and a recording/reproducing track formed on the track-forming-surface in the recordable area, and extending continuously, the recording/reproducing track including the same dye material as each of the pits, the information reproducing method having the processes of: emitting an initial light beam to all of the pits before reproduction, in order to change reflectance of all of the pits; emitting a reproducing light to each of the pits; receiving a reflective light of the reproducing light reflected by the reproducing track, and generating a receiving signal corresponding to the received reflective light; and reproducing the reproducing information on the basis of the receiving signal.

Namely, before the information reproducing apparatus actually reproduces the reproducing information recorded in the read-only area, all of the pits are irradiated with the initial light. Thereby, reflectance of all of the pits are changed. This enables to reproduce the reproducing information.

Thereafter, each of the pits are irradiated with the reproducing light, and the reflective light of the reproducing light reflected by the reproducing track is received. Furthermore, the receiving signal corresponding to the received reflective light is generated. Next, the reproducing information on the basis of the receiving signal is reproduced.

Accordingly, it is possible to detect the reproducing information from the dye pits accurately, and to reproduce the reproducing information surely.

The nature, utility, and further features of this invention will be more clearly apparent from the following detailed description with respect to preferred embodiments of the invention when lead-in conjunction with the accompanying drawings briefly described below.

DETAILED DESCRIPTION OF THE PREFERRED EMBODIMENTS

Referring to the accompanying drawings, embodiments of the present invention will be now explained.

(I) Hybrid Disc

At first, an embodiment of the present invention with respect to a dye record medium will be explained with reference to FIGS. 1 to 4. A hybrid disc explained below is an embodiment of the present invention with respect to a dye record medium. The hybrid disc has a read-only area (it is referred to as a "ROM area".) and a recordable area. In the ROM area, only reproduction of information is possible. On the other hand, in the recordable area, both reproduction of information and only once recording of information are possible.

Figure 1:
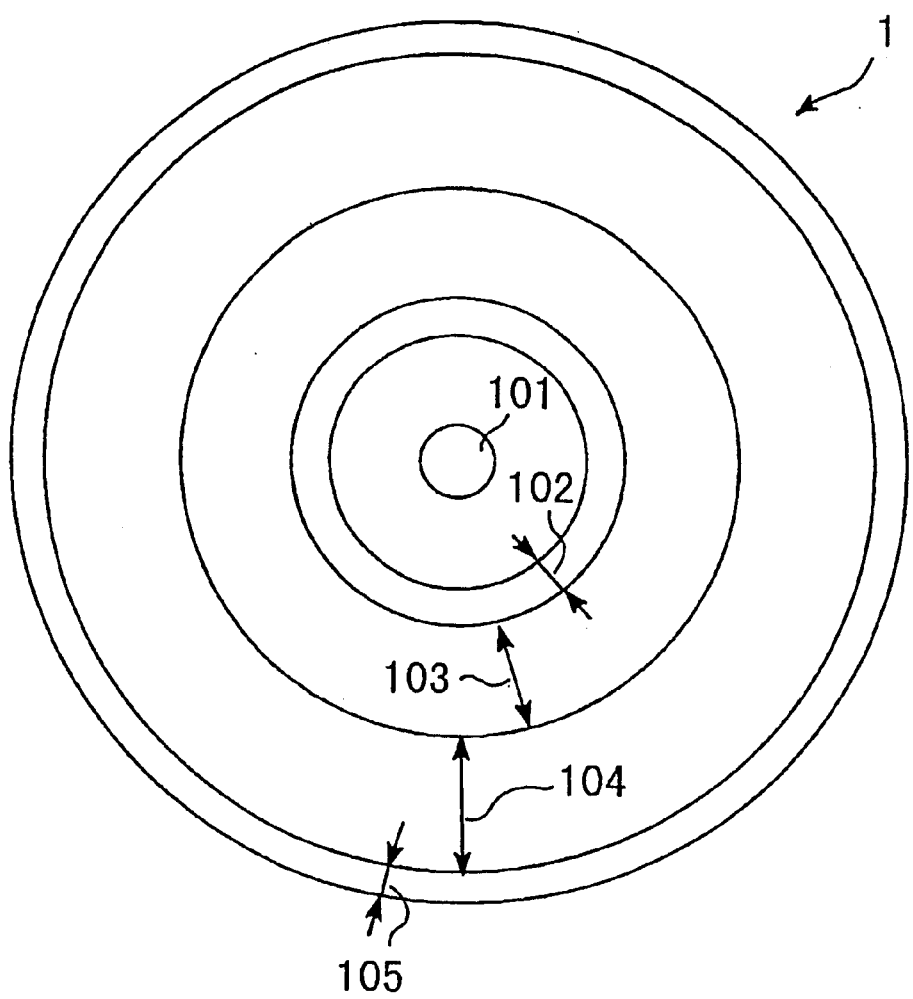
FIG. 1 is a diagram showing a hybrid disc of an embodiment of the present invention.

Here, a configuration of the hybrid disc is explained in further detail. FIG. 1 shows the whole configuration of the hybrid disc.

In FIG. 1, a hybrid disc 1 has: a clamp hole 101 for fixing the hybrid disc 1 on a disc mount; a lead-in area 102; a ROM area 103; a recordable area 104; and a lead-out area 105. In each of the lead-in area 102 and the lead-out area 105, information to be used for automatically reproducing information recorded on the hybrid disc 1 is recorded. For example, in the lead-in area 102, TOC (Table Of Contents) information is recorded. The TOC information represents a type of disc, and is used for distinction between the hybrid disc 1, an ordinary CD, a CD-ROM, or the like. Furthermore, the total memory capacity of the ROM area 103 and the recordable area 104 is approximately equal to that of a standard type DVD (about 5 G byte). Moreover, no information is recorded in an area between the clamp hole 101 and the lead-in area 102.

Figure 2:
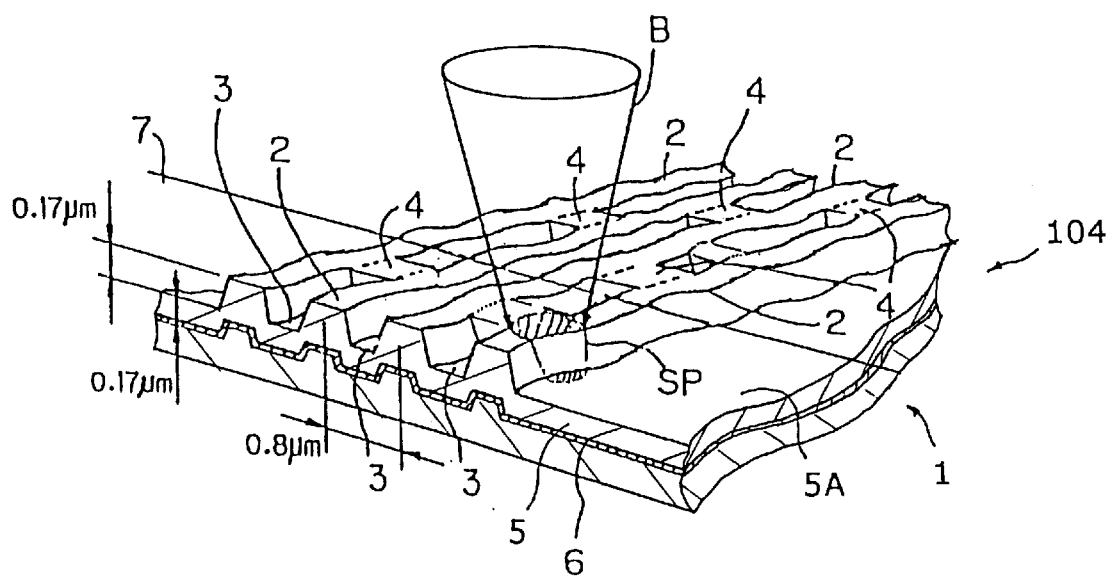
FIG. 2 is an enlarged sectional view showing a recordable area of the hybrid disc of the embodiment.

Next, a configuration of the recordable area 104 is explained with reference to FIG. 2. FIG. 2 shows the recordable area 104 in enlarged.

As shown in FIG. 2, in the recordable area 104, a dye membrane 5 is formed, and the recordable area 104 functions as a dye record medium capable of recording information only once. Furthermore, in the recordable area 104, a groove track 2 and a land track 3 are formed on the surface 5A of the dye membrane 5. As shown in FIG. 2, the groove track 2 and the land track 3 are integrated with the dye membrane 5. The groove track 2 functions as a recording/reproducing track. The land track 3 guides a light beam B. For example, the light beam B is a laser beam, and the light beam B is used for both recording and reproduction. Moreover, in the recordable area 104, a protection layer 7 and a gold vapor deposition surface 6 are formed. The protection layer 7 protects the groove track 2 and the land track 3. The a gold vapor deposition surface 6 reflects the light beam B when information is reproduced. A pre-pit 4 is formed on the land track 3. The pre-pit 4 corresponds to a pre-information. The pre-pit 4 is formed in advance. Namely, the pre-pit 4 is formed at the stage that the hybrid disc 1 itself is produced. Moreover, for example, the height of the groove track 2 is approximately 0.17 [$\mu$m].

Here, the pre-information recorded by forming the pre-pit 4 includes rotation control information and address information. The rotation control information is used for controlling a rotation of the hybrid disc 1 when recording or reproducing. The address information indicates a position in the recordable area 104.

Furthermore, in the recordable area 104, the rotation control information is recorded by wobbling the groove track 2 depending on frequency corresponding to rotation velocity of the hybrid disc 1. Like pre-pit 4, the wobbles are formed at the stage that the hybrid disc 1 itself is produced. Namely, the rotation control information is recorded in advance.

When record information (Hereinafter, the recording information means actual information to record, such as image information, document information, music information, and so on, other than the pre-information.) is recorded in the recordable area 104, an information recording/reproducing apparatus described below detects the wobbling frequency from the groove track 2, fetches the rotation control information from the wobbling frequency, and rotates the hybrid disc 1 in a predetermined rotation velocity on the basis of the rotation control information. Furthermore, the information recording/reproducing apparatus detects the pre-pit 4, fetches the pre-information from the pre-pit 4, and sets an optimum power of the light beam B on the basis of the pre-information. Moreover, the information recording/reproducing apparatus extracts the address information from the pre-information, records the record information at a certain position in the recordable area 104 on the basis of the address information.

Here, the record information is recorded by forming a record information pit corresponding to the record information on the groove track 2. The record information pit is formed by irradiation of the light beam B. When the record information pit is formed, the light beam B is emitted onto the groove track 2 such that the center of the light beam B is just positioned at the center of the groove track 2. At this time, as shown in FIG. 2, the diameter of the light spot SP is larger than the width of the groove track 2. Thereby, the light beam B is emitted both onto the groove track 2 and the land track 3. A reflective light reflected by the land track 3 is used for detecting the pre-pit 4 and fetching the pre-information. The detection of the pre-pit 4 is performed by using a push-pull method. A photodetector divided by a parting line parallel to a rotation direction of the hybrid disc 1 is used in the push-pull method (Hereinafter, this method is referred to as a "radial push-pull method".). A reflective light reflected by the groove track 2 is used for detecting the wobbling frequency. A clock signal to be used for the rotation control is generated on the basis of the detected wobbling frequency.

Figure 3:
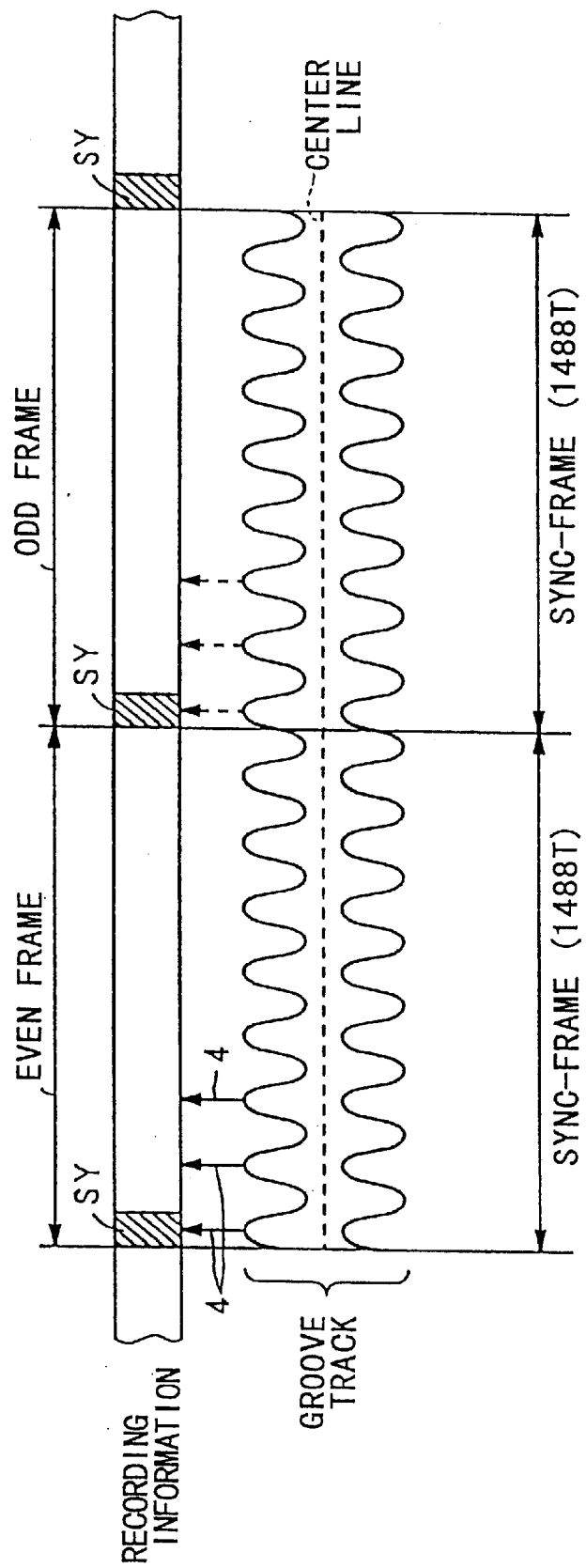
FIG. 3 is a diagram showing a record format in the recordable area of the embodiment.

Next, a record format of the pre-information and the record information in the recordable area 104 is explained with reference to FIG. 3. FIG. 3 shows the record format. In FIG. 3, a diagram drawn at the upper part shows the record format of the record information, and a diagram drawn at the lower part shows a condition of the wobbles of the groove track 2. The upward arrows arranged between the diagram showing the record format and the diagram showing the wobbles show positions of the pre-pits 4. In addition, the wobbles shown in FIG. 3 are exaggerated. The amplitude of the actual wobbles is smaller than that shown in FIG. 3. Furthermore, the recording information is recorded on the center line of the groove track 2 (shown by dotted line in FIG. 3).

As shown in FIG. 3, the record information is divide by sync-frame. A recording sector is constructed by 26 sync-frames. An ECC (Error Correcting Code) block is constructed by 16 recording sectors. In addition, each sync-frame has 1488 times unit length. The unit length corresponds to the bit interval defined by the recording format. Hereinafter, the alphabet "T" represents the unit length. So, as shown in FIG. 3, the length of each sync-frame is 1488T. Moreover, synchronous information is recorded at the top part of each sync-frame. The length of the synchronous information is 14T. The synchronous information is used for synchronizing for each sync-frame.

In each sync-frame, one pre-pit 4 is formed at the position adjacent to the part where the synchronous information is recorded. A synchronous signal is generated on the basis of this pre-pit 4. Moreover, one or two pre-pits 4 are further formed in the area adjacent to the front part of the sync-frame. The address information is fetched from these pre-pits 4. In addition, these pre-pits 4 used for fetching the address information is not always formed. In the embodiment, in each recording sector, the pre-pits 4 are formed in only either one of the even sync-frame and the odd sync-frame. For example, in FIG. 3, the pre-pits 4 are formed in the even sync-frame, but they are not formed in the odd sync-frame.

The groove track 2 is wobbled in the constant wobbling frequency f0, for example, 140 [kHz], with respect to the all sync-frame (8 waves are fitted in every one of the sync-frames.). The information recording/reproducing apparatus detects the constant wobbling frequency f0, and generates a signal to control rotation of a spindle motor.

Figure 4:
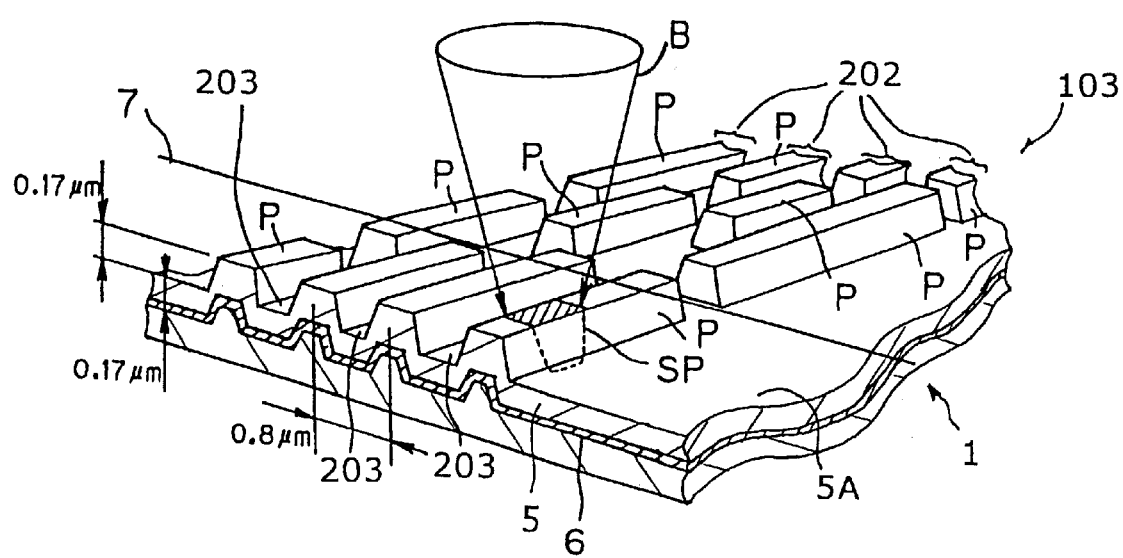
FIG. 4 is an enlarged sectional view showing a ROM area of the hybrid disc of the embodiment.

Next, a configuration of the ROM area 103 is explained with reference to FIG. 4. FIG. 4 shows the ROM area 103 in enlarged.

As shown in FIG. 4, like the recordable area 104, a land track 203 and a groove track 202 are formed in the ROM area 103. The land track 203 and the groove track 202 are formed by the same dye membrane 5 as the groove track 2 and the land track 3 of the recordable area 102. Namely, the land track 203 and the groove track 202 are formed on the surface 5A of the dye membrane 5, and they are integrated with the dye membrane 5. The height of the groove track 202 is the same as that of the groove track 2 (e.g., approximately 0.17 [$\mu$m]).

Furthermore, the groove track 202 is constructed by an arrangement of a plurality of dye pits P. Like a phase pit of a CD, the shape of each dye pit P corresponds to information to be recorded in the ROM area 103. Namely, the length of each dye pit P is changed between 3T to 14T, depending on the information to be recorded in the ROM area 103. Thus, in the ROM area 103, information is recorded by the arrangement of the dye pits P. In thickness of the dye membrane 5, the part between two phase pits P adjacently arranged along the groove track 202 is thinner than other parts of the grooving track 202 (the parts where the dye pits P are formed). Moreover, the part between two phase pits P, the land track 203, and the land track 3 of the recordable area 102 (the part where the pre-pit 4 is not formed) are in the same plane.

When the information recorded by the arrangement of the dye pits P is reproduced, the light beam B is emitted as shown in FIG. 4. At this time, the quantity of the reflective light of the light beam B is different between the part where the dye pit is formed and the part where the dye pit is not formed. The information is reproduced by detecting the difference. More concretely, in the embodiment, before the information is reproduced from the ROM area 103, the light beam B is emitted onto the all dye pits P in the recording power. Thereby, a characteristic (e.g., reflectance) of the dye pits P (i.e., the dye membrane 5 of the dye pits P) is changed. As a result, the reflectance of the part where the dye pit P is formed becomes different from the reflectance of the part where the dye pit P is not formed. Thereafter, the information is reproduced on the basis of the reflective light of the light beam B. In addition, the recording power means the power of the light beam B when the record information pit is formed on the groove track 2 in the recordable area 104.

In addition, in the groove track 202 shown in FIG. 2, as it is unnecessary to fetch the rotation control information, the synchronous information, etc., a wobble and a pre-pit are not formed.

(II) Cutting Apparatus

Next, an embodiment of the present invention with respect to a record disc producing apparatus will be explained with reference to FIG. 5. A cutting apparatus explained below is an embodiment of the present invention with respect to a record disc producing apparatus. The cutting apparatus is used for forming the ROM area 103 and the recordable area 104 shown in FIGS. 2 and 4.

Figure 5:
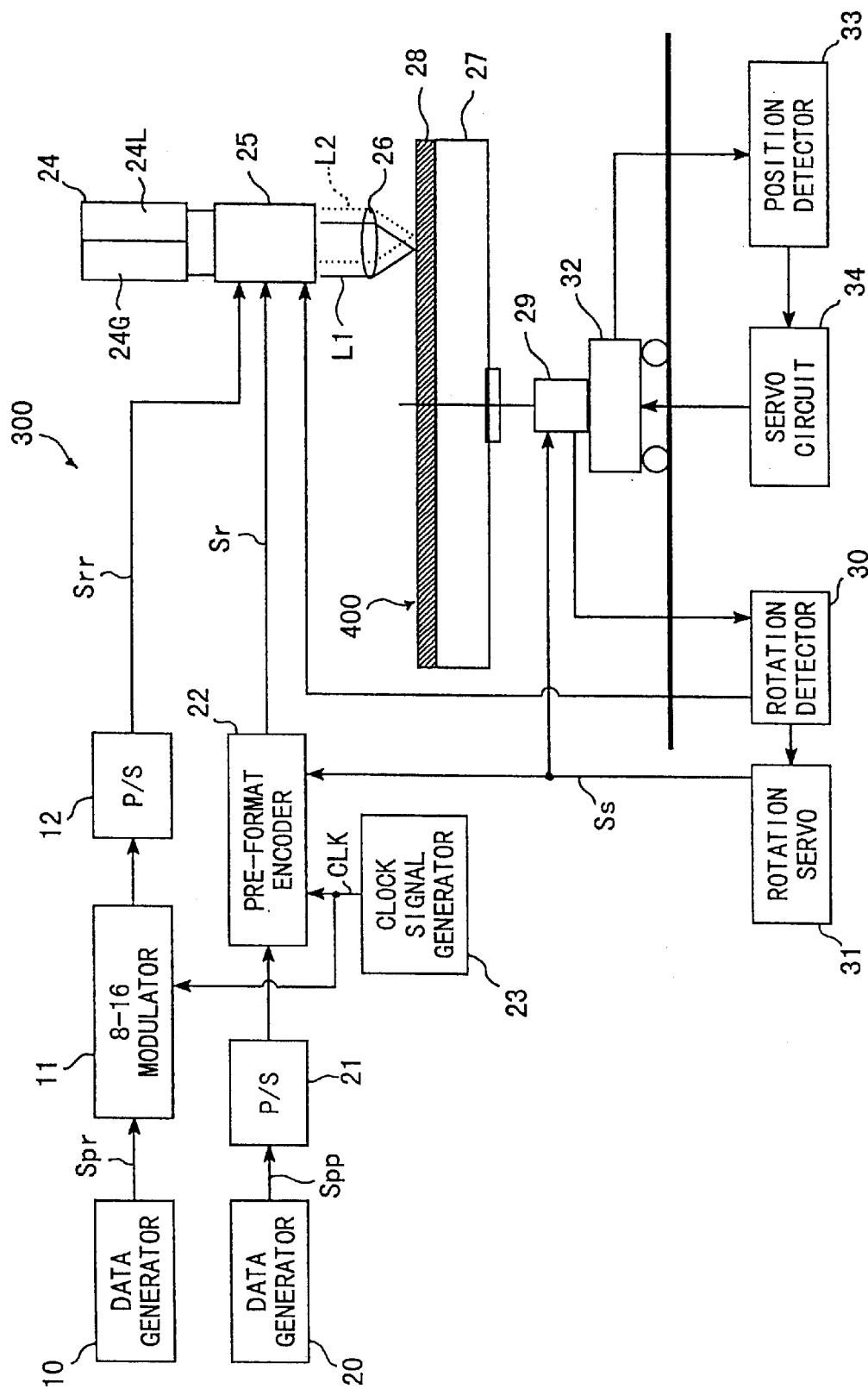
FIG. 5 is a block diagram showing a cutting apparatus of an embodiment of the present invention.

FIG. 5 shows a cutting apparatus 300. Referring to the FIG. 5, a configuration of the cutting apparatus 300 is explained. In addition, the cutting apparatus 300 is used for producing a stamper disc 400 in order to mass-produce the hybrid disc 1.

As shown in FIG. 5, The cutting apparatus 300 has: data generators 10 and 20; an 8–16 modulator 11; a parallel/serial converters 12 and 21; a pre-format encoder 22; a clock signal generator 23, a laser generator 24; a light converter 25; an objective lens 26; a spindle motor 29; a rotation detector 30; a rotation servo circuit 31; a sending unit 32; a position detector 33; and a servo circuit 34. Furthermore, the laser generator 24 has: a first emitter 24G for emitting a light beam L1 to form the groove tracks 2 and 202; and a second emitter 24L for emitting a light beam L2 to form the land tracks 3 and 203.

On the other hand, the stamper disc 400 has: a glass substrate 27 serving as a base; and a resist 28 that is coated on the glass substrate 27. The resist 28 is used for forming tracks.

Next, an operation to form the ROM area 103 is explained. When the cutting apparatus 300 forms the ROM area 103 on the stamper disc 400, the cutting apparatus 300 forms pits corresponding to information to be recorded into the ROM area 103. These pits are models of the dye pits P of the hybrid disc 1. In this time, the data generator 10 generates data information Spr corresponding to the information to be recorded into the ROM area 103. Next, the 8–16 modulator 11 modulates the data information Spr on the basis of a clock signal CLK outputted from the clock signal generator 23. The frequency of the clock signal CLK corresponds to "T". Furthermore, the 8–16 modulator 11 forms an ECC block with respect to the data information Spr. Next, the parallel/serial converter 12 parallel/serial-converts the data information Spr, and outputs recording information Srr to the light converter 25.

Next, the light converter 25 modulates intensity of the light beam L1 on the basis of the recording information Srr, and emits the light beam L1 to the objective lens 26. At this time, the recording information Srr is constructed by a combination of an "H" signal and an "L" signal corresponding to the data information Spr. Furthermore, for example, the "H" signal corresponds to the weak intensity of the light beam L1, and the "L" signal corresponds to the strong intensity of the light beam L1. Then, the light beam L1 modulated in this manner is emitted on the resist 28, and the pits corresponding to the dye pits P are formed on the resist 28.

On the other hand, when the land track 203 is formed on the stamper disc 400, the light beam L2 is emitted to the objective lens 26. The intensity of the light beam L2 is kept constant by the DC (Direct Current) driving device (not shown in the drawings).

The light beam L1 having the modulated intensity and the light beam L2 having the constant intensity are simultaneously emitted on the resist 28 from the objective lens 26. Thus, the groove track 202 and the land track 203 are formed in the ROM area 103 on the resist 28.

The spindle motor 29 rotates the stamper disc 400, while the light beam L1 and the light beam L2 are emitted. The rotation detector 30 detects the rotation number of the stamper disc 400. The rotation servo circuit 31 servo-controls the rotation of the stamper disc 400 on the basis of the detected rotation number. At this time, the rotation servo circuit 31 outputs the rotation detecting signal Ss to the pre-format encoder 22 and the spindle motor 29, each time the stamper disc 400 is rotated one rotation.

Moreover, while these operation are carried out, the sending unit 32 is moved together with the spindle motor 29 and the stamper disc 400 in the radial direction of the stamper disc 400 in order to form the groove track 202 and the land track 203 in a spiral shape. At this time, the position detector 33 detects a position of the sending unit 32, and the sending servo circuit 34 servo-controls the movement of the sending unit 32 on the basis of the detected position of the sending unit 32.

Thus, the light beams L1 and L2 are emitted on the stamper disc 400, while the stamper disc 400 is rotated and moved in the radial direction. Thereby, the groove track 202 and the land track 203 are formed in the coaxial spiral shape in the area corresponding to the ROM area 103 on the stamper disc 400.

Next, an operation to form the recordable area 104 is explained. When the cutting apparatus 300 forms the recordable area 104 on the stamper disc 400, the cutting apparatus 300 forms pits corresponding to the pre-information, together with the land track 3. In this time, the data generator 20 generates data pre-information Spp corresponding to the pre-information. Next, the parallel/serial converter 21 parallel/serial-converts the data pre-information Spp. Next, the pre-format encoder 22 further converts the data pre-information Spp into the recording pre-information Sr on the basis of the clock signal CLK and the rotation detecting signal Ss, and outputs the recording pre-information Sr to the light converter 25.

Next, the light converter 25 modulates intensity of the light beam L2 on the basis of the recording pre-information Sr, and emits the light beam L2 to the objective lens 26. At this time, the record pre-information Sr is constructed by a combination of an "H" signal and an "L" signal corresponding to the data pre-information Spp. Furthermore, for example, the "H" signal corresponds to the weak intensity of the light beam L2, and the "L" signal corresponds to the strong intensity of the light beam L2. Then, the light beam L2 modulated in this manner is emitted on the resist 28, and the land track 3 having the pit corresponding to the pre-pit 4 is formed on the resist 28.

On the other hand, when the groove track 2 is formed on the stamper disc 400, the light beam L1 is emitted to the objective lens 26. The intensity of the light beam L1 is kept constant by the DC (Direct Current) driving device (not shown in the drawings). Furthermore, at this time, the irradiate position is controlled in order to form the wobbles of the groove track 2 as shown in FIGS. 2 and 3.

The light beam L2 having the modulated intensity and the light beam L1 having the constant intensity are simultaneously emitted on the resist 28 from the objective lens 26. Thus, the groove track 2, the land track 3 and the pits corresponding to the pre-pits 4 are formed in the recordable area 104 on the resist 28.

At this time, like forming the ROM area 103 on the stamper disc 400, the spindle motor 29, the rotation detector 30, the rotation servo circuit 31, the sending unit 32, the position detector 33 and the sending servo circuit 34 operate.

Thus, the light beams L1 and L2 are emitted on the stamper disc 400, while the stamper disc 400 is rotated and moved in the radial direction. Thereby, the groove track 2 and the land track 3 are formed in the coaxial spiral shape in the area corresponding to the recordable area 104 on the stamper disc 400.

Here, the intensity of the light beam L2 when the ROM area 103 is formed, the intensity of the light beam L1 corresponding to the "H" signal when the ROM area 103 is formed, and the intensity of the light beam L2 corresponding to the "H" signal when the recordable area 104 is formed are the same intensity. Further, the intensity of the light beam L1 corresponding to the "L" signal when the ROM area 103 is formed, the intensity of the light beam L1 when the recordable area 104 is formed, and the intensity of the light beam L2 corresponding to the "L" signal when the recordable area 104 is formed are the same intensity. Accordingly, on the stamper disc 400, the part of the land track 3 where the pits corresponding to the pre-pits 4 are not formed, the land track 203, the part of the groove track 202 where the pits corresponding to the dye pits P are not formed are in the same plane. Further, the part of the land track 3 where the pits corresponding to the pre-pits 4 are formed, the groove track 2, and the part of the groove track 202 where the pits corresponding to the dye pits P are formed are in the same plane.

After the cutting apparatus 300 produces the stamper disc 400, the hybrid disc 1 having the same shape as the stamper disc 400 is mass-produced. Namely, the resist 28 exposed by the light beams L1 and L2 is developed, and the developed resist 28 is treated by a conductive process and a nickel electroforming process. Thereby, a nickel stamper disc is produced. Next, the hybrid disc 1 is produced by using the nickel stamper disc. A 2P processing method or an injection molding method is used for producing the hybrid disc 1.

In addition, in the produced hybrid disc 1, the part of the land track 3 where the pre-pits 4 are not formed, the land track 203, and the part of the groove track 202 where the dye pits P are not formed are in the same plane, and the part of the land track 3 where the pre-pits 4 are formed, the groove track 2 and the part of the groove track 202 where the dye pits P are formed are in the same plane.

(III) Information Recording/Reproducing Apparatus

Next, an embodiment of the present invention with respect to an information recording/reproducing apparatus is explained with reference to FIGS. 6 and 7. An information recording/reproducing apparatus explained below is an embodiment of the present invention. The information recording/reproducing apparatus records the recording information onto the hybrid disc 1, and reproduces information recorded on the hybrid disc 1. When recording the recording information into the recordable area 104, the information recording/reproducing apparatus detects the pre-pits 4, fetches the address information on the basis of the pre-pits 4, determined the recording position on the basis of the address information, and records the recording information at the determined position. Furthermore, the information recording/reproducing apparatus detects the wobbles of the groove track 2 as a wobbling signal, generates a base clock signal on the basis of the wobbling signal, and controls the rotation of the hybrid disc 1 on the basis of the base clock signal.

Figure 6:
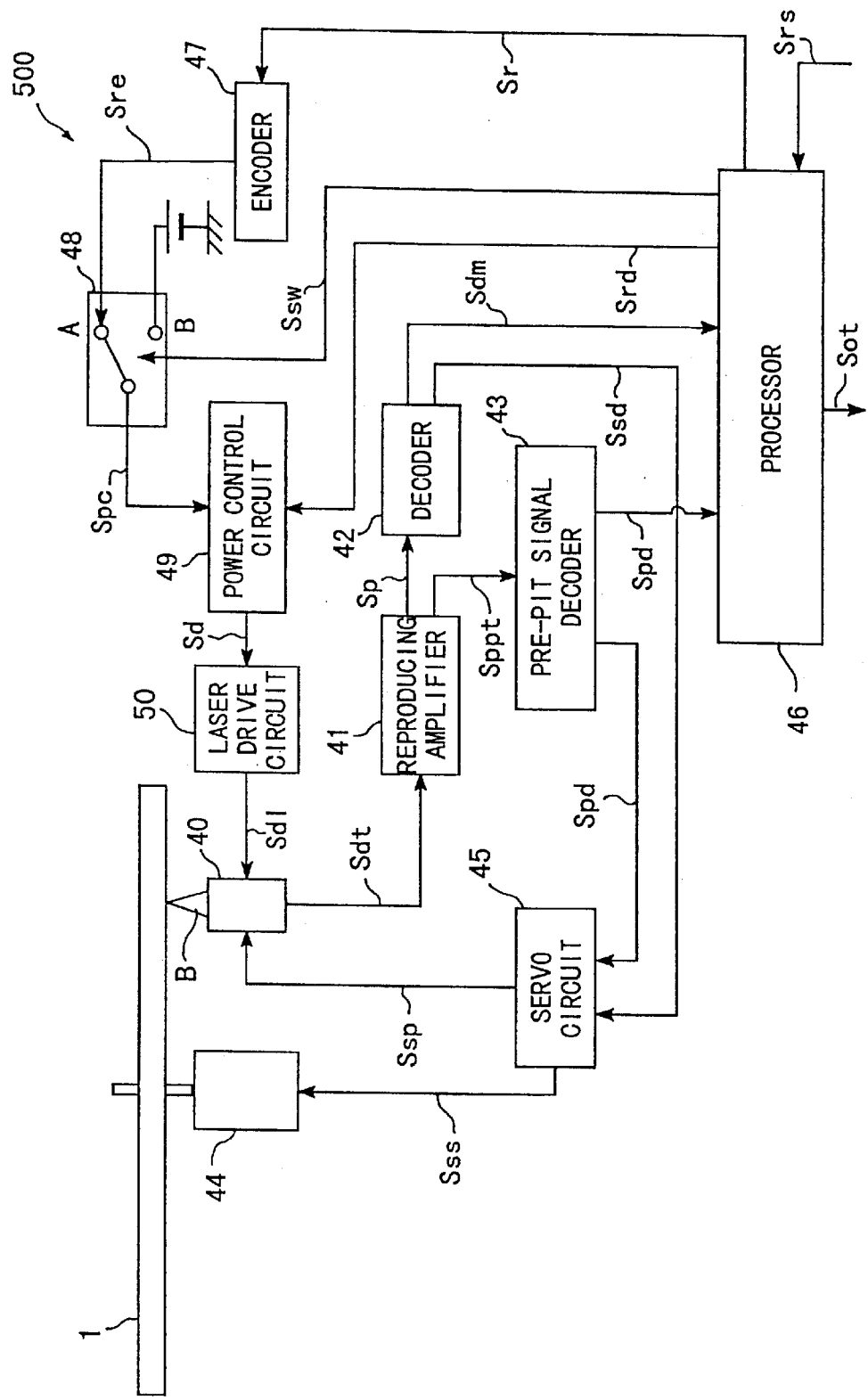
FIG. 6 is a block diagram showing an information recording/reproducing apparatus of an embodiment of the present invention.
Figure 7:
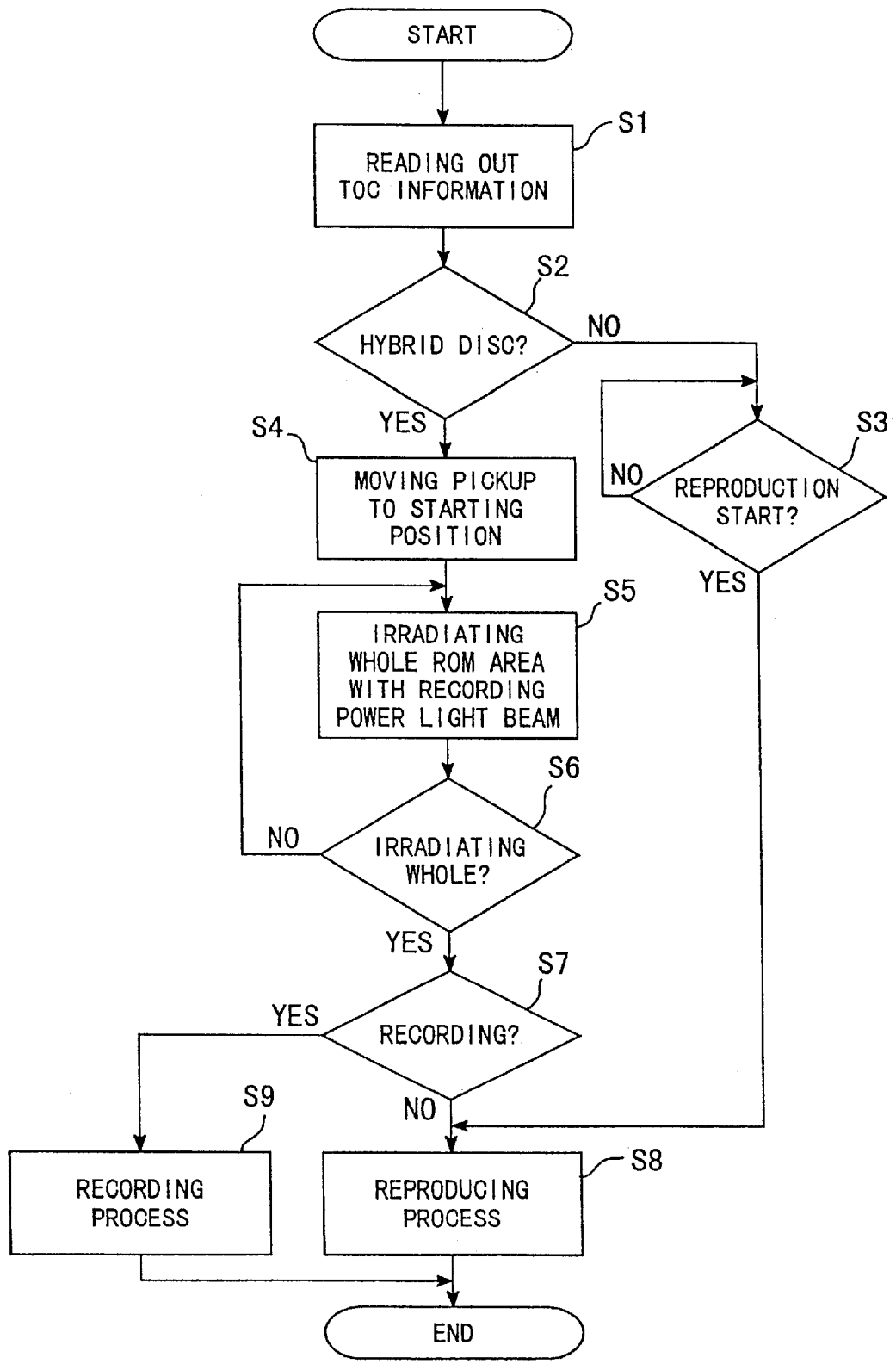
FIG. 7 is a flowchart showing an operation of the information recording/reproducing apparatus of the embodiment.

Here, FIG. 6 shows a configuration of the information recording/reproducing apparatus 500. In FIG. 6, the apparatus 500 has: a pickup 40 serving as an initial light beam emitter, a reproducing light beam emitter, a photo-receiver and a recording light beam emitter; a reproducing amplifier 41 serving as a reproducing device; a decoder 42 serving as the reproducing device; a pre-pit signal decoder 43; a spindle motor 44; a servo circuit 45; a processor 46; an encoder 47; a switch 48; a power control circuit 49; and a laser drive circuit 50.

The pickup 40 has a laser diode, a polarization beam splitter, an objective lens and a photodetector. The pickup 40 emits the light beam B onto the dye membrane of the hybrid disc 1 on the basis of a laser driving signal Sdl, detects the pre-pits 4 on the basis of a reflective light of the light beam B, and records the recording information in the recordable area 104. Furthermore, the pickup 40 reproduces reproducing information recorded in the ROM area 103 on the basis of the reflective light of the light beam B.

The reproducing amplifier 41 amplifies a detection signal outputted from the pickup 40. The detection signal Sdt includes information corresponding to the pre-pits 4 or the reproducing information. Furthermore, the reproducing amplifier 41 outputs a pre-pit signal Sppt corresponding to the pre-pits 4, or an amplified signal Sp corresponding to the reproducing information.

The decoder 42 performs an 8–16 demodulation and deinterleave in order to decode the amplified signal Sp, and outputs a demodulated signal Sdm and a servo demodulation signal Ssd.

The pre-pit signal decoder 43 decodes the pre-pit signal Sppt, and outputs a demodulated pre-pit signal Spd.

The servo circuit 45 outputs a pickup servo signal Ssp on the basis of the demodulated pre-pit signal Spd and servo demodulation signal Ssd, in order to perform a focus servo control and a tracking servo control in the pickup 40. Furthermore, the servo circuit 45 also outputs a spindle servo signal Sss on the basis of the demodulated pre-pit signal Spd and servo demodulation signal Ssd, in order to control the rotation of the spindle motor 44. The spindle motor 44 rotates the hybrid disc 1.

The processor 46 temporarily stores the recording information Srs inputted from the external, and outputs a recording information signal Sr corresponding to the recording information Srs. Furthermore, the processor 46 outputs a reproducing signal Sot corresponding to the reproducing information to the external on the basis of the demodulated signal Sdm. Moreover, the processor 46 outputs a switching signal Ssw on the basis of the demodulated pre-pit signal Spd.

Further, when the hybrid disc 1 is mounted onto a disc mount of the apparatus 500, the processor 46 outputs a control signal Srd to the power control circuit 49 in order to emit the light beam B having a constant intensity and the recording power onto the hybrid disc 1.

The encoder 47 adds an ECC code to the recording information signal Sr, and forms the ECC block. Furthermore, the encoder 47 performs an interleave and an 8–16 modulation in order to process the ECC block, and outputs the modulated signal Sre.

The switch 48 switches over a modulated signal Sre outputted from the encoder 47 and a constant voltage, and outputs either one of the modulated signal Sre and the constant voltage, as an output signal Spc.

The power control circuit 49 outputs a driving signal Sd on the basis of the output signal Spc and the control signal Srd, in order to control an output of the laser diode installed in the pickup 40.

The laser drive circuit 50 outputs the laser driving signal Sdl on the basis of the driving signal Sd, in order to drive the laser diode and to emit the light beam B.

Next, a recording and a reproducing operation of the apparatus 500 is explained with reference to FIG. 7.

When the apparatus 500 records the information onto the hybrid disc 1 or reproduce the information from the hybrid disc 1, at first, the pickup 40 emits the light beam B to the lead-in area 102 of the hybrid disc 1, and read out the TOC information on the basis of the reflective light of the light beam B (Step 1). In addition, like detection of the pre-pits 4, the radial push-pull method is used for reading out the TOC information.

Next, the processor 46 determines whether or not the disc mounted on the disc mount is the hybrid disc 1 on the basis of the TOC information (Step 2). If the mounted disc 1 is a read-only disc, such as an ordinary CD and a CD-ROM (Step 2; NO), the processor 46 next determines whether or not an instruction to start the reproduction is inputted from the external (Step 3). If the instruction is not inputted (Step 3; NO), the processor 46 waits until the instruction is inputted. On the other hand, if the instruction is inputted (Step 3; YES), the switch 48 connects the constant voltage to the power control circuit 49 on the basis of the switching signal Ssw outputted from the processor 46. Namely, when the apparatus 500 reproduces the read-only disc, the constant voltage is supplied to the power control circuit 49, and the power control circuit 49 sets the output power of the light beam B at the constant reproduction power that is lower than the recording power, on the basis of the constant voltage. More concretely, when the output signal Spc corresponding to the constant voltage is outputted to the power control circuit 49, the power control circuit 49 generates the driving signal Sd on the basis of the output signal Spc, and next, the laser drive circuit 50 generates the laser driving signal Sdl on the basis of the driving signal Sd. Then, the driving signal Sd drives the laser diode installed in the pickup 40, and the pickup 40 emits the light beam B on the read-only disc. Thereby, information recorded on the read-only disc is detected, and the demodulated signal Sdm corresponding to the detected information is inputted onto the processor 46. Then, the processor 46 outputs the reproduction signal Sot to the external (Step 8).

On the other hand, in the step 2, if the processor 46 determines that the disc mounted on the disc mount is the hybrid disc 1 (Step 2; YES), the pickup 40 is moved to the starting position in the ROM area 103 (Step 4). Here, in the embodiment, the starting position is the most inner circumferential portion in the ROM area 103. Next, the power control circuit 49 outputs the control signal Sd on the basis of the control signal Srd outputted from the processor 46. Thereby, the pickup 40 emits the light beam B having the recording power. The light beam B having the recording power is emitted onto the whole ROM area 103 (Step 5). As a result, the character (reflectance) of the dye membrane (dye pits) formed in the ROM area 103 is changed, and this enables to reproduce the information recorded in the ROM area 103.

Next, the processor 46 determines whether or not the light beam B having the recording power is emitted onto the whole ROM area 103 (Step 6), If the light beam B is not emitted onto the whole ROM area 103 (Step 6; NO), the irradiation is continued. On the other hand, if the light beam B is perfectly emitted onto the whole ROM area 103 (Step 6; YES), the processor 46 determines whether or not the recording information is recorded (Step 7). If the recording information is recorded on the recordable area 104 (Step 7; YES), the switch 48 connects the encoder 47 and the power control circuit 49 on the basis of the switching signal Ssw, and the modulated signal Sre is supplied to the power control circuit 49 as the output signal Spc. Thereby, the power control circuit 49 and the laser drive circuit 50 operate, and the pickup 40 emits the light beam B in the recordable area 104 on the hybrid disc 1. At this time, the power of the light beam B is changed over on the basis of the modulated signal Sre. Namely, when the recording information pit is formed on the groove track 2, the power of the light beam B is set at the recording power, and when the recording information pit is not formed on the groove track 2, the power of the light beam B is set at the reproducing power. That is, when the light beam B having the recording power is emitted onto the dye membrane 5, the reflectance of the dye membrane 5 is changed, and when the light beam B having the reproducing power is emitted onto the dye membrane 5, the reflectance of the dye membrane 5 is not changed. Thus, the information corresponding to the modulated signal Sre is recorded on the groove track 2 (Step 9). In addition, at this time, the pre-pits 4 and the wobbles of the groove track 2 are detected, the rotation of the hybrid disc 1 is controlled, the address information is fetched, and the recording of the information is controlled by the processor 46.

On the other hand, at the step 7, if the processor 46 determines that the recording information is not recorded (Step 7; NO), the information recorded in the recordable area 104 or the reproducing information recorded in the ROM area 103 is reproduced. Namely, like the reproduction of the read-only disc, the switch 48 connects the constant voltage to the power control circuit 49 on the basis of the switching signal Ssw, the pickup 40 emits the light beam B having the reproducing power, and the processor 46 outputs the reproducing signal Sot on the basis of the detected information from the recordable area 104 or the ROM area 103.

As explained above, according to the hybrid disc 1, the cutting apparatus 300 and the information recording/reproducing apparatus 500 of the embodiment of the present invention, the groove track 203 in the ROM area 103 is constructed by the arrangement of the plurality of the dye pits P whose shapes correspond to the reproducing information, the reflectance of the light beam B is changed depending on presence or absence of the dye pit P, the dye pits P and groove track 2 in the recordable track 104 are composed of the same dye material, and the dye pits P and the groove track 2 has the same height. Accordingly, when the hybrid disc 1 is produced, the groove track 202 (dye pits P) and the groove track 2 are formed in the same process, and it is possible to simplify the production process of the hybrid disc 1. That is, it is possible to produce the hybrid disc 1 easy.

Furthermore, the groove track 202 is constructed by the arrangement of the dye pits P having shapes corresponding to the reproducing information. Accordingly, it is possible to reproduce the reproducing information surely.

Furthermore, the light beam B having the recording power is emitted onto the all dye pits P in order to change the reflectance of the dye pits P, and thereafter, the reproducing information is reproduced by emitting the light beam B having the reproducing power onto the dye pits whose reflectance have been changed. Accordingly, it is possible to reproduce the reproducing information surely.

Moreover, the characteristic of the dye pit P is changed by emitting the light beam B having the recording power. Accordingly, it is possible to simplify the configuration of the information recording/reproducing apparatus 500.

In addition, in the aforementioned embodiment, when reproduction or recording is actually performed by the information recording/reproducing apparatus 500, the light beam B having the recording power is emitted onto the dye pits P in order to the reflection of the dye pits P. However, the present invention is not limit to this. For example, when the hybrid disc 1 is produced, the light beam B having the recording power may be emitted onto the dye pits P in order to the reflection of the dye pits P.

Furthermore, in the aforementioned embodiment, the light beam B having the recording power is emitted onto the dye pits P in order to the reflection of the dye pits P. However, the present invention is not limited to this. For example, if changing the reflection of the dye pits P is possible, the light beam B having a power weaker than the recording power may be emitted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus for reproducing information recorded on a dye record disc, the dye record disc comprising: a disc shape substrate having a track-forming-surface divided into a read-only area and a recordable area; a reproducing track formed on the track-forming-surface in the read-only area, and constructed by an arrangement of a plurality of pits, each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information reproducing apparatus comprising:

an initial light emitting device for emitting an initial light beam to all of the pits before reproduction, in order to change reflectance of all of the pits;

a reproducing light emitting device for emitting a reproducing light to each of the pits;

a receiving device for receiving a reflective light of the reproducing light reflected by the reproducing track, and generating a receiving signal corresponding to the received reflective light; and a reproducing device for reproducing the reproducing information on the basis of the receiving signal.

2. An information recording/reproducing apparatus for recording information onto a dye record disc and reproducing information recorded on the dye record disc, the dye record disc comprising: a disc shape substrate having a track-forming-surface divided into a read-only area a recordable area; a reproducing track formed on the track-forming-surface in the read-only area, and constructed by an arrangement of a plurality of pits, each of the pits comprising a dye material, and having a shape corresponding to the reproducing information. recording/reproducing track formed on the track-forming-surface in the recordable area, and extending continuously, the recording/reproducing track comprising the same dye material as each of the pits, the information recording/reproducing apparatus comprising:

an initial light emitting device for emitting an initial light beam to all of the pits before reproduction, in order to change reflectance of all of the pits;

a reproducing light emitting device for emitting a reproducing light to each of the pits;

a receiving device for receiving a reflective light of the reproducing light reflected by the reproducing track, and generating a receiving signal corresponding to the received reflective light;

a reproducing device for reproducing the reproducing information on the basis of the receiving signal; and a recording light emitting device for emitting a recording light modulated on the basis of the recording information onto the recording/reproducing track, in order to record the record information onto the recording/reproducing track by changing reflectance of the recording/reproducing track.

3. An information recording/reproducing apparatus according to claim 2, wherein the initial light emitting device emits the initial light beam having an intensity of the reproducing light.

4. An information reproducing method of reproducing information recorded on a dye record disc, the dye record disc comprising: a disc shape substrate having a track-forming-surface divided into a read-only area a recordable area; a reproducing track formed on the track-forming-surface in the read-only area, and constructed by an arrangement of a plurality of pits, each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information reproducing method comprising the process of:

emitting an initial light beam to all of the pits before reproduction, in order to change reflectance of all of the pits;

emitting a reproducing light to each of the pits;

receiving a reflective light of the reproducing light reflected by the reproducing track, and generating a receiving signal corresponding to the received reflective light; and reproducing the reproducing information on the basis of the receiving signal.

5. An information reproducing apparatus according to claim 1, wherein the initial light emitting device emits the initial light beam having an intensity of the reproducing light.

6. An information reproducing apparatus for reproducing information recorded on a read-only disc having a read-only area or reproducing information recorded on a dye record disc, the dye record disc comprising: a disc shape substrate having a track-forming-surface divided into the read-only area and a recordable area; a reproducing track formed on the track-forming-surface in the read-only area, and constructed by an arrangement of a plurality of pits, each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information reproducing apparatus comprising:

a determining device for determining whether a disc mounted on the information reproducing apparatus is the dye record disc;

an initial light emitting device for emitting an initial light beam to the read-only area if the mounted disc is the dye record disc, in order to change reflectance of all of the pits.

7. An information reproducing apparatus according to claim 6, wherein the determining device determines whether the mounted disc is the dye record disc on the basis of the TOC information of the mounted disc.

8. An information reproducing apparatus according to claim 6, wherein the initial light emitting device emits the initial light beam having an intensity of the reproducing light.

9. An information recording/reproducing apparatus for recording information onto a dye record disc, and for reproducing information recorded on the dye record disc or on a read-only disc having a read-only area, the dye record disc comprising: a disc shape substrate having a track-forming-surface divided into a read-only area and a recordable area; a reproducing track formed on the track-forming-surface in the read-only area, and constructed by an arrangement of a plurality of pits, each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information recording/reproducing apparatus comprising:

a determining device for determining whether a disc mounted on the information reproducing apparatus is the dye record disc;

an initial light emitting device for emitting an initial light beam to the read-only area if the mounted disc is the dye record disc, in order to change reflectance of all of the pits.

10. An information recording/reproducing apparatus according to claim 9, wherein the determining device determines whether the mounted disc is the dye record disc on the basis of the TOC information of the mounted disc.

11. An information recording/reproducing apparatus according to claim 9, wherein the initial light emitting device emits the initial light beam having an intensity, the intensity being lower than that of the reproducing light and higher than that of the reproducing light.

12. An information recording/reproducing method of reproducing information on a read-only disc having a read-only area or reproducing information recorded on a dye record disc, the dye record disc comprising: a disc shape substrate having a track-forming-surface divided into the read-only area a recordable area; a reproducing track formed on the track-forming-surface in the read-only area, and constructed by an arrangement of a plurality of pits; each of the pits comprising a dye material, and having a shape corresponding to the reproducing information; and a recording/reproducing track formed on the track-forming-surface in the recordable area, and extending continuously, the recording/reproducing track comprising the same dye material as each of the pits, the information recording/reproducing method comprising the processes of:

determining whether a disc mounted on the information reproducing apparatus is the dye record disc;

emitting an initial light beam to the read-only area if the mounted disc is the dye record disc, in order to change reflectance of all of the pits.

* * * * *